US012766918B2

(12) United States Patent
Nakagawa et al.

(10) Patent No.: US 12,766,918 B2
(45) Date of Patent: Oct. 20, 2026

(54) INFORMATION PROCESSING DEVICE FOR ACTIVATING REMOTE AIR CONDITIONING OF A VEHICLE

(71) Applicant: TOYOTA JIDOSHA KABUSHIKI KAISHA, Toyota (JP)

(72) Inventors: Yuki Nakagawa, Toyota (JP); Keizoh Kawaguchi, Okazaki (JP); Kazumi Aono, Tokyo (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 0 days.

(21) Appl. No.: 18/893,966

(22) Filed: Sep. 24, 2024

(65) Prior Publication Data

US 2025/0214392 A1 Jul. 3, 2025

(30) Foreign Application Priority Data

Dec. 27, 2023 (JP) ................................ 2023-220837

(51) Int. Cl.

*B60R 21/01* (2006.01)
*B60H 1/00* (2006.01)
*E05F 15/71* (2015.01)
*E05F 15/73* (2015.01)

(52) U.S. Cl.

CPC ..... *B60H 1/00742* (2013.01); *B60H 1/00657* (2013.01); *B60H 1/00835* (2013.01); *E05F 15/73* (2015.01); *E05Y 2900/55* (2013.01)

(58) Field of Classification Search

CPC ............ B60H 1/00742; B60H 1/00657; B60H 1/00835; E05F 15/73; E05Y 2900/55
See application file for complete search history.

(56) References Cited

U.S. PATENT DOCUMENTS

| | | | | |
|---|---|---|---|---|
| 11,198,388 | B1 * | 12/2021 | Crose | B60N 2/0026 |
| 2015/0084759 | A1 * | 3/2015 | Stefan | B60N 2/26 340/438 |
| 2017/0028811 | A1 * | 2/2017 | Jayasundera | A61B 5/6893 |
| 2018/0237024 | A1 * | 8/2018 | Mummidi | G06N 5/04 |
| 2021/0293072 | A1 * | 9/2021 | Srivastava | E05F 15/73 |
| 2024/0017590 | A1 * | 1/2024 | Rehwinkel | B60H 1/00757 |
| 2024/0017730 | A1 * | 1/2024 | Shen | B60H 1/00978 |

(Continued)

FOREIGN PATENT DOCUMENTS

| | | | | |
|---|---|---|---|---|
| CN | 104191931 A | * 12/2014 | | B60H 1/00 |
| CN | 211201539 U | * 8/2020 | | E05F 15/695 |

(Continued)

OTHER PUBLICATIONS

Machine Translation of Foreign Reference: CN104191931A—Gao et al. (Year: 2014).*

(Continued)

*Primary Examiner* — Scott A Browne
*Assistant Examiner* — Rami Nabih Bedewi
(74) *Attorney, Agent, or Firm* — SoraIP, Inc.

(57) ABSTRACT

A control unit configured to operate remote air conditioning of a vehicle in response to a person being present in a rear seat of a parked vehicle and open a window of the vehicle in response to a remaining charge amount of a battery of the vehicle being less than or equal to a predetermined amount when the remote air conditioning of the vehicle is being operated.

6 Claims, 4 Drawing Sheets

(56) References Cited

U.S. PATENT DOCUMENTS

| | | | | |
|---|---|---|---|---|
| 2024/0246503 | A1* | 7/2024 | Date | B60H 1/00978 |
| 2025/0196574 | A1* | 6/2025 | Kakade | B60H 1/00742 |
| 2025/0304034 | A1* | 10/2025 | Sharma | B60L 58/12 |

FOREIGN PATENT DOCUMENTS

| | | | |
|---|---|---|---|
| JP | 2021-183467 | A | 12/2021 |
| JP | 2023-030311 | A | 3/2023 |

OTHER PUBLICATIONS

Machine Translation of Foreign Reference: CN211201539U—Chen (Year: 2019).*

* cited by examiner

INFORMATION PROCESSING DEVICE FOR ACTIVATING REMOTE AIR CONDITIONING OF A VEHICLE

CROSS-REFERENCE TO RELATED APPLICATION

This application claims priority to Japanese Patent Application No. 2023-220837 filed on Dec. 27, 2023, incorporated herein by reference in its entirety.

BACKGROUND

1. Technical Field

The present disclosure relates to an information processing device.

2. Description of Related Art

It is known that, in response to detection of presence of an infant in a vehicle non-use state, the in-vehicle temperature is adjusted by remote air conditioning and cooling control is performed when the in-vehicle temperature is equal to or higher than a predetermined temperature. It is known that, in response to detection of presence of an infant in a vehicle non-use state, a window is opened to promote ventilation (see Japanese Unexamined Patent Application Publication No. 2021-183467 (JP 2021-183467 A), for example).

SUMMARY

An object of the present disclosure is to suppress an increase in in-vehicle temperature when a person is left in a rear seat of a vehicle.

One aspect of the present disclosure is an information processing device including: a control unit that is configured to execute activating remote air conditioning of a vehicle in response to presence of a person in a rear seat of the vehicle that is being parked, and opening a window of the vehicle in response to the remaining charge amount of a battery of the vehicle becoming equal to or less than a predetermined amount when the remote air conditioning of the vehicle is being activated.

The present disclosure can also be regarded as an information processing method in which a computer executes the processing of the above information processing device. Moreover, the present disclosure can also be regarded as an information processing program that causes a computer to execute the information processing method or a non-transitory storage medium storing the information processing program.

According to the present disclosure, it is possible to suppress an increase in in-vehicle temperature when a person is left in a rear seat of a vehicle.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

When a person such as an infant is left behind in the rear seat of the vehicle, it is conceivable to operate remote air conditioning in order to suppress an increase in temperature inside the vehicle. However, in battery electric vehicle (BEV), when the remaining charge amount of the battery reaches zero, the remote air conditioning is stopped, and thereafter, the in-vehicle temperature rises.

On the other hand, the control unit included in the information processing device according to one aspect of the present disclosure operates the remote air conditioning of the vehicle in response to the presence of a person in the rear seat of the parked vehicle. This suppresses an increase in temperature inside the vehicle. Further, when the remote air conditioning of the vehicle is being operated, the control unit opens the window of the vehicle in response to the remaining charge amount of the battery of the vehicle becoming equal to or less than the predetermined amount. Here, the predetermined amount is at least the amount of electric power required to open the window. The window may be opened so as to be fully opened, or may be opened so as to be a predetermined opening degree. The opening degree may be, for example, an opening degree capable of suppressing intrusion into the vehicle from the outside. In this way, the vehicle interior environment can be maintained satisfactorily with the remote air conditioning operating as much as possible. Further, when the remaining charge amount of the battery becomes equal to or less than the predetermined amount, the window is opened, so that the ventilation can be promoted even if the remote air conditioning is stopped thereafter, so that an increase in the temperature inside the vehicle can be suppressed.

Hereinafter, an embodiment of the present disclosure will be described with reference to the drawings. The hardware configuration, the module configuration, the functional configuration, and the like described in the following embodiments are not intended to limit the technical scope of the disclosure only thereto unless otherwise specified.

First Embodiment

Figure 1:
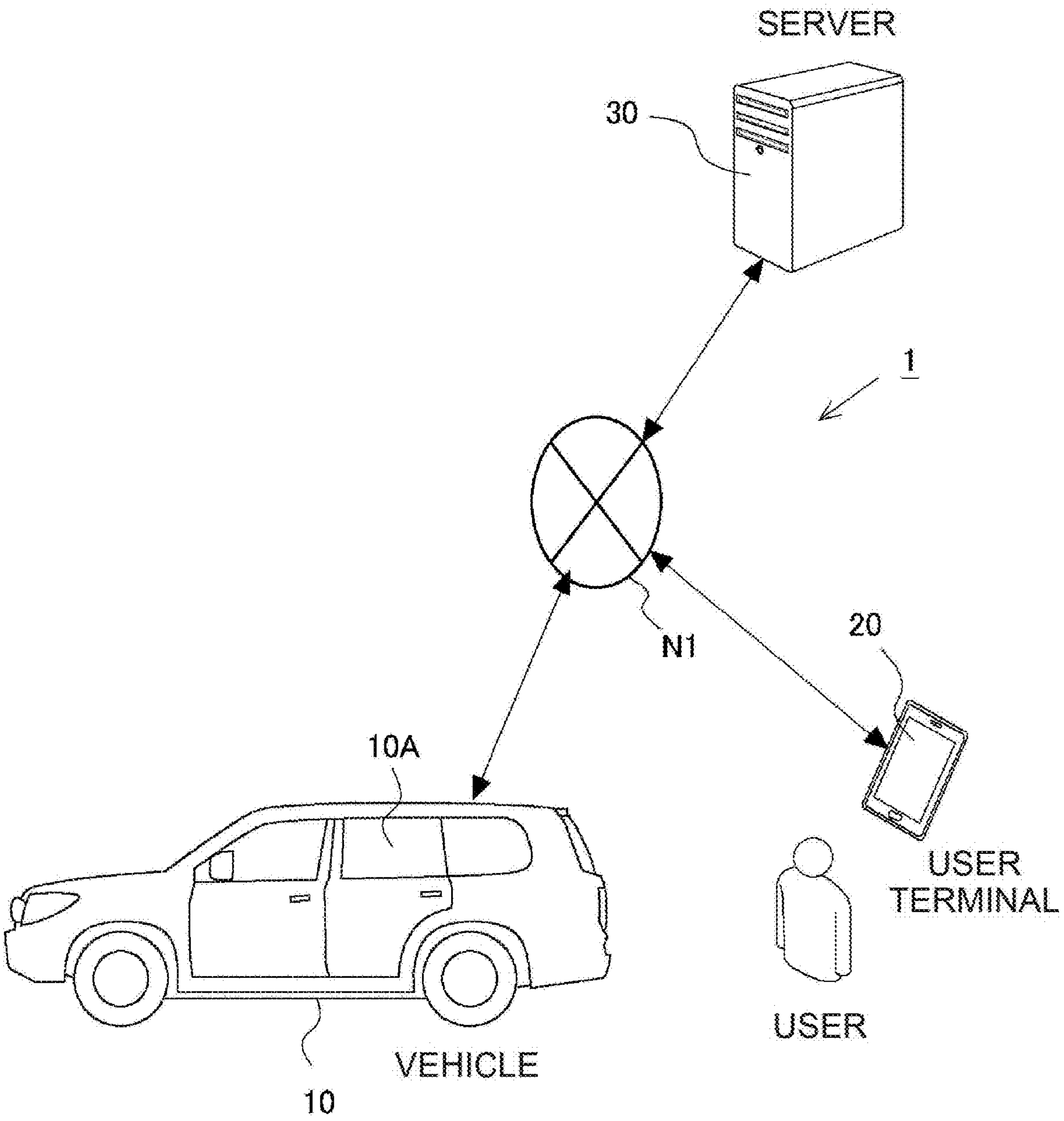
FIG. 1 is a diagram illustrating a schematic configuration of a system according to a first embodiment.

FIG. 1 is a diagram illustrating the overall configuration of a system 1 according to a first embodiment. The system 1 is a system capable of remotely operating an air conditioner (hereinafter referred to as an air conditioner) of the vehicle 10. In addition, the system 1 is a system capable of opening and closing the windows 10A of the vehicles 10 by remote control. The window 10A to be opened and closed by remote control is, for example, a window existing on the rear seat side, but is not limited thereto, and may be, for example, a window on the driver's seat or the passenger's seat side, a window on the luggage compartment side, or all the windows provided in the vehicles 10.

In the example illustrated in FIG. 1, the system 1 includes a vehicle 10, a user terminal 20, and a server 30. The user terminal 20 is a mobile terminal owned by the user. Further, the vehicle 10 is a vehicle associated with the user terminal

20. There may be a plurality of vehicles 10 and a plurality of user terminals 20. The server 30 may include a plurality of servers. The vehicles 10, the user terminals 20, and the servers 30 are connected to each other by a network N1. The network N1 is, for example, a world-wide public communication network such as the Internet, and a wide area network (WAN) or other communication networks may be adopted. In addition, the network N1 may include a telephone communication network such as a mobile phone network and a wireless communication network such as Wi-Fi (registered trademark).

Figure 2:
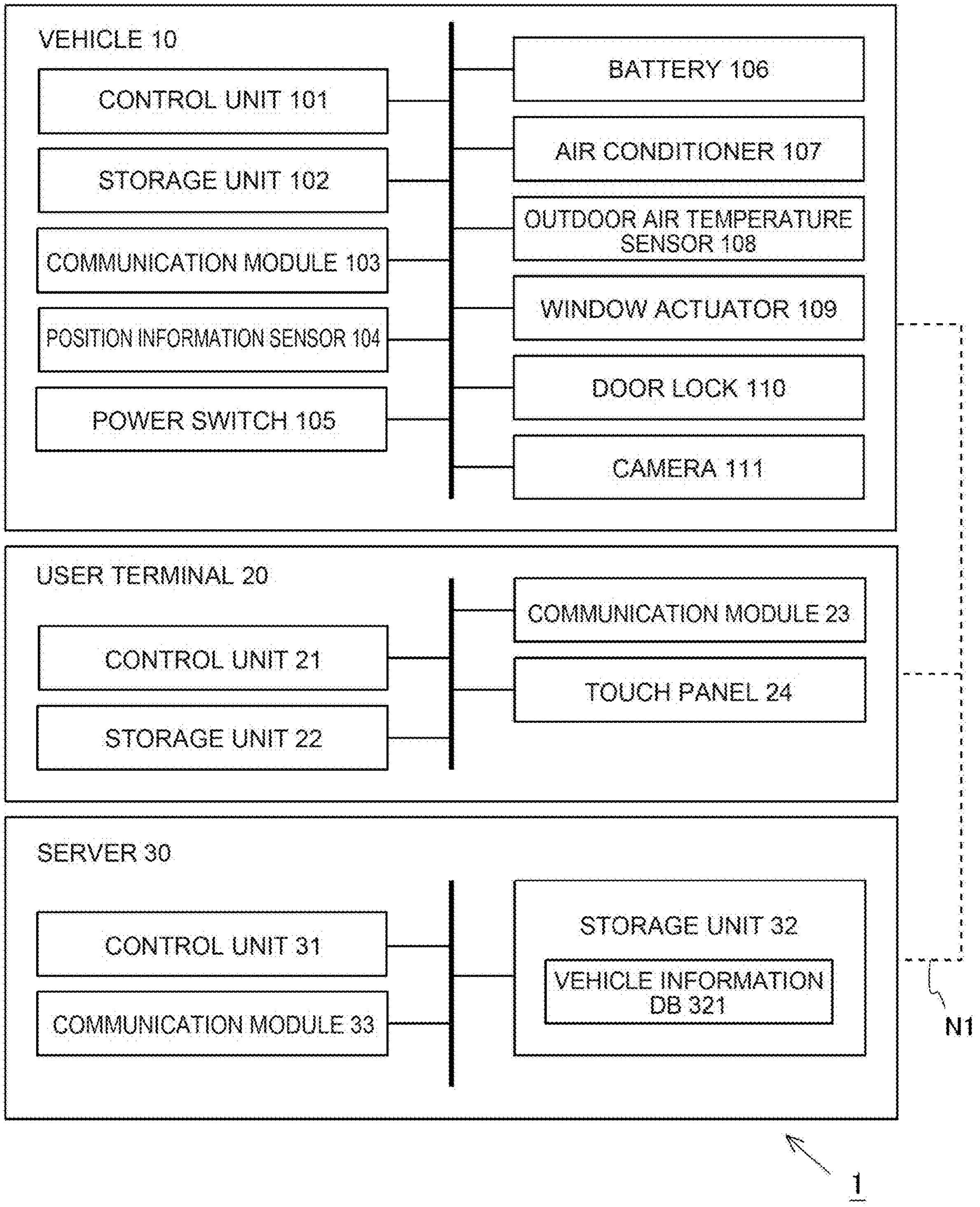
FIG. 2 is a block diagram schematically illustrating an example of a configuration of each of a vehicle, a user terminal, and a server constituting the system according to the first embodiment.

FIG. 2 is a block diagram schematically showing an example of the configuration of each of the vehicle 10, the user terminal 20, and the server 30 constituting the system 1 according to the first embodiment. The server 30 can be configured as a computer including a processor (such as a CPU, GPU), a main storage device (such as a RAM, ROM), and a secondary storage device (such as an EPROM, a hard disk drive, and a removable medium). The secondary storage device stores an operating system (OS), various programs, various tables, and the like. By executing the program stored therein, it is possible to realize each function (software module) that meets a predetermined purpose, as will be described later. However, some or all of the modules may be realized as hardware modules by, for example, hardware circuitry such as an ASIC, FPGA.

The server 30 includes a control unit 31, a storage unit 32, and a communication module 33. The control unit 31 is an arithmetic unit that realizes various functions of the server 30 by executing a predetermined program. The control unit 31 can be realized by, for example, a hardware processor such as a CPU. The control unit 31 may include a RAM, ROM, a cache memory, and the like. Details of the control unit 31 will be described later.

The storage unit 32 is a unit that stores information, and is configured by a storage medium such as a RAM, a magnetic disk, or a flash memory. The storage unit 32 stores a program executed by the control unit 31, data used by the program, and the like. In addition, a database (vehicle information DB 321) is constructed in the storage unit 32. The control unit 31 acquires information on the vehicle 10 (hereinafter, also referred to as vehicle information). The vehicle information is information for associating the vehicle 10 with the user terminal 20. In the vehicle data, a vehicle ID that is an identifier unique to the vehicle 10, a user ID that is an identifier unique to the user, and user terminal ID that is an identifier unique to the user terminal 20 are stored. This information is previously registered by the user in the server 30 using the user terminal 20. Upon acquiring the vehicle information, the control unit 31 stores the vehicle information in the vehicle information DB 321. The storage unit 32 also stores the detection value of the sensor transmitted from the vehicle 10 and information regarding the state of the vehicle 10.

The communication module 33 is a communication interface for connecting the servers 30 to the network N1. The communication module 33 may be configured to include, for example, a network interface board, a wireless communication interface for wireless communication, and the like. The server 30 can perform data communication with the vehicle 10 and the user terminal 20 via the communication module 33.

The vehicles 10 are each a battery electric vehicle (BEV) equipped with an electric motor. The vehicle 10 includes a control unit 101, a storage unit 102, a communication module 103, a position information sensor 104, and a power switch 105. The vehicle 10 includes a battery 106, an air conditioner 107, an outside air temperature sensor 108, a window actuator 109, a door lock 110, and a camera 111. These components are connected to each other by a CAN bus, which is a bus of an in-vehicle network. These components may be components such as a data communication module (DCM), a head unit, a navigation system, an air conditioner system, and a traveling system.

The control unit 101 can be realized by, for example, a hardware processor such as a CPU. In addition, the control unit 101 may be configured to include a RAM, a read only memory (ROM), a cache memory, and the like. The storage unit 102 is means for storing information, and is composed of a storage medium such as a RAM, a magnetic disk, or a flash memory. The storage unit 102 stores programs executed by the control unit 101, data used by the programs, and the like.

The communication module 103 is a communication unit for connecting the vehicles 10 to the network N1. In the present embodiment, vehicles 10 can communicate with other devices (for example, servers 30) over a network N1 using a mobile communication service such as 3G, LTE, 5G, 6G. The position information sensor 104 acquires position information (for example, latitude and longitude) of the vehicle 10 at a predetermined cycle. The position information sensor 104 is, for example, a global positioning system (GPS) receiver, a radio communication unit, or the like. The power switch 105 is a switch that activates the vehicle 10 or stops the function of the vehicle 10 when the user presses the switch. Each time the user presses the power switch 105, the power is switched on and off. The power-on state is a state in which the vehicle 10 is activated, and is a state in which the vehicle 10 can travel. The power-off state is a state in which the function of the vehicle 10 is stopped, and is a state in which the vehicle 10 cannot travel (parked state). Even in the power-off state, the remote air conditioning and the like are configured to be operable.

The battery 106 is a secondary battery that supplies electric power to an electric motor that drives the vehicle 10, the air conditioner 107, the window actuator 109, and the like. The battery 106 is charged by an external power source. The air conditioner 107 is a device that is operated by electric power supplied from the battery 106 to adjust the temperature inside the vehicle 10. The outside air temperature sensor 108 is a sensor that detects a temperature outside the vehicle 10. The window actuator is an actuator for opening and closing the window 10A, and is typically an electric motor.

The door lock 110 is a device for locking and unlocking the door of the vehicle 10. The door lock 110 is configured to be able to lock and unlock the door of the vehicle 10 by remote control from the outside of the vehicle 10. The camera 111 is a device that performs imaging using an image sensor such as, for example, a charge coupled device (CCD) image sensor or a complementary metal oxide semiconductor (CMOS) image sensor. The image acquired by photographing or filming may be either a still image or a moving image. The camera 111 is provided in the vehicle and is arranged to photograph at least the rear seat.

The control unit 101 of the vehicle 10 acquires the position information acquired by the position information sensor 104, the remaining charge amount of the battery 106, and the like at predetermined intervals, associates them with the vehicle ID, and transmits them to the servers 30. Further, the control unit 101 of the vehicle 10 transmits parking information, which is information indicating that the vehicle 10 is parked, to the server 30 when the power switch 105 is pressed to be in a power-off state and the door is locked by the door lock 110 by remote operation from the outside of the vehicle 10. The parking information includes image data obtained by photographing the rear seat of the vehicle 10 by the camera 111. The parking information may further include information on the outside air temperature detected by the outside air temperature sensor 108. The control unit 101 of the vehicle 10 captures an image of the rear seat of the vehicle 10 by the camera 111 when the power switch 105 is pressed, the vehicle 10 is in a power-off state, and the door is locked by the door lock 110 by remote control from the outside of the vehicle 10. Then, the control unit 101 transmits the image data obtained at that time to the server 30.

In addition, the control unit 101 of the vehicle 10 operates the air conditioner 107 upon receiving a command to operate the remote air conditioning from the server 30. In addition, the control unit 101 of the vehicle 10 stops the operation of the air conditioner 107 when receiving a command to stop the operation of the remote air conditioning from the server 30. In addition, when receiving a command to open the window 10A from the servers 30, the control unit 101 of the vehicles 10 operates the window actuator 109 to open the window 10A.

The user terminal 20 is a terminal used by a user of the vehicle 10, and is, for example, a smart phone, a tablet terminal, a wearable terminal, or a personal computer (PC). In the user terminal 20, for example, application software capable of remotely controlling air conditioning of the vehicle 10 is installed. The user terminal 20 includes a control unit 21, a storage unit 22, a communication module 23, and a touch panel 24. The control unit 21, the storage unit 22, and the communication module 23 of the user terminal 20 have the same configuration as the control unit 101, the storage unit 102, and the communication module 103 of the vehicle 10. The touch panel 24 is a device that receives an input from a user and a device that presents information to the user. For example, a touch panel display including a liquid crystal display (LCD) or an electroluminescence (EL) panel.

When the control unit 21 of the user terminal 20 receives a notification from the server 30 that a person is left behind in the rear seat of the vehicle 10, it causes the touch panel 24 to display an image corresponding to the notification. After that, when there is a predetermined input on the touch panel 24, information corresponding to the input is transmitted to the server 30.

Upon receiving the parking information from the vehicle 10, the control unit 31 of the server 30 analyzes the image data included in the parking information, and determines whether or not there is a person in the rear seat. In this analysis, a known image analysis technique can be used. The control unit 31 acquires the remaining charge amount of the battery 106 of the vehicle 10 in response to the determination that a person is present in the rear seat. Then, it is determined whether or not the remaining charge amount is larger than a predetermined amount. This predetermined amount is the remaining charge amount that allows the window actuator 109 to be actuated to open the window 10A. The control unit 31 activates the remote air conditioning in response to determining that the remaining charge amount of the vehicle 10 is larger than the predetermined amount. This suppresses an increase in temperature inside the vehicle. When the remaining charge amount of the battery 106 becomes equal to or less than the predetermined amount after the remote air conditioning is operated, a command for opening the window 10A by operating the window actuator 109 is transmitted to the vehicle 10. Note that the information on the remaining charge amount of the battery 106 is transmitted to the server 30 at predetermined time intervals during the operation of the remote air conditioning even when the vehicle 10 is powered off. In this way, if it can be difficult to continuously operate the remote air conditioning, ventilating the interior of the vehicle can be facilitated by opening the window 10A. As a result, an increase in the temperature inside the vehicle can be suppressed. That is, the remote air conditioning is operated as much as possible until immediately before the remaining charge amount of the battery 106 becomes insufficient. Thus, the window 10A may be opened just before the remaining charge amount of the battery 106 is insufficient, while maintaining a good cabin environment. Therefore, it may be possible to prevent the cabin temperature from increasing thereafter.

Figure 3:
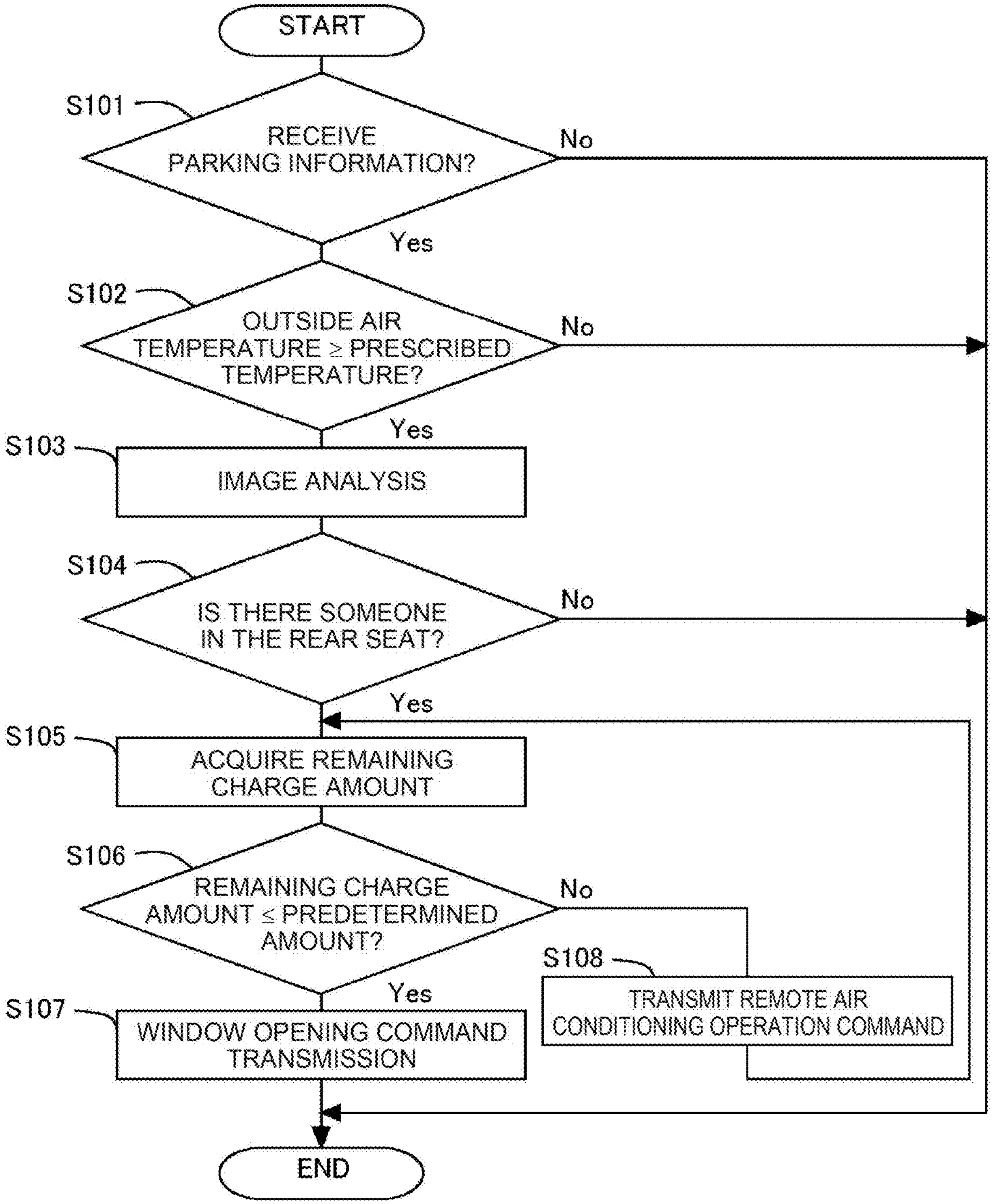
FIG. 3 is a flow chart showing a process in the server according to the first embodiment.

FIG. 3 is a flowchart illustrating processing in the server 30 according to the first embodiment. The flowchart illustrated in FIG. 3 is executed in the server 30 at predetermined time intervals. Note that the vehicle information DB 321 will be described on the assumption that required information is stored.

In S101, the control unit 31 determines whether or not parking data has been received from the vehicles 10. If the control unit 31 makes an affirmative determination in S101, the process proceeds to S103, and if a negative determination is made, the routine ends. In S102, the control unit 31 determines whether or not the outside air temperature detected by the outside air temperature sensor 108 of the vehicle 10 is equal to or higher than a predetermined temperature. Information on the outside air temperature detected by the outside air temperature sensor 108 is included in the parking information. The predetermined temperature is a temperature at which the temperature of the vehicle 10 can increase unless the air conditioner 107 is operated. When the outside air temperature is low, an increase in the temperature inside the vehicle is suppressed even if the remote air conditioning is not operated, and therefore, in such a case, it is not necessary to operate the remote air conditioning. Therefore, it is set as the operating condition of the remote air conditioning that the outside air temperature is equal to or higher than the predetermined temperature. Note that S102 process may be omitted. When S102 process is omitted, the information on the outside air temperature detected by the outside air temperature sensor 108 may not be included in the parking information. If the control unit 31 makes an affirmative determination in S102, the process proceeds to S103, and if a negative determination is made, the routine ends.

In S103, the control unit 31 analyzes the image-data included in the parking-information. In S104, the control unit 31 determines whether or not a person is present in the rear seats of the vehicles 10 based on the analysis in S103. In S103 and S104, a known process of extracting a person from the image-data can be used. If the control unit 31 makes an affirmative determination in S104, the process proceeds to S105, and if a negative determination is made, the routine ends.

In S105, the control unit 31 refers to the storage unit 32 and acquires the remaining charge amount of the battery 106. Note that the remaining charge amount of the battery 106 is transmitted to the server 30 by the control unit 101 of the vehicle 10 at predetermined time intervals. Then, the control unit 31 of the server 30 stores the received remaining charge amount of the battery 106 in the storage unit 32. The control unit 31 refers to the storage unit 32 to acquire the latest remaining charge amount of the battery 106. As another example, the control unit 31 may inquire of the vehicle 10 about the remaining charge amount of the battery 106. In S106, the control unit 31 determines whether or not the remaining charge amount of the battery 106 acquired by S105 is equal to or less than a predetermined amount. The predetermined quantity may be set as close to zero as possible so that the remote air conditioning can be activated as much as possible and the window 10A can be opened. If the control unit 31 makes an affirmative determination in S106, the process proceeds to S107, and if it makes a negative determination, the process proceeds to S108.

In S107, the control unit 31 transmits a window opening command, which is a command to open the window 10A, to the vehicles 10. Upon receiving the command, the control unit 101 of the vehicle 10 operates the window actuator 109 to open the window 10A. At this time, the control unit 101 of the vehicle 10 may fully open the window 10A, may be half-opened, or may have an opening degree such that the inside of the vehicle is not accessible from the outside. When the window 10A is fully opened, ventilation in the vehicle can be further promoted. On the other hand, it is possible to prevent a third party from entering the inside of the vehicle by setting an opening degree such that the vehicle is not accessible from the outside. Note that the window opening command may include a command for stopping the remote air conditioning. The control unit 101 of the vehicle 10 that has received the window opening command may stop the remote air conditioning and open the window 10A. In S107, the control unit 31 may transmit the window opening command to the vehicle 10 and notify the user terminal 20 that the window has been opened.

On the other hand, in S108, the control unit 31 transmits a remote air conditioning operation command, which is a command to operate the remote air conditioning, to the vehicles 10. The control unit 101 of the vehicle 10 that has received the remote air conditioning operation command operates the remote air conditioning. When the remote air conditioning is already in operation, the operation of the remote air conditioning is continued in the vehicle 10. When the process of S108 is completed, the process returns to S105. In S108, the control unit 31 may transmit a command to operate the remote air conditioning to the vehicle 10 and notify the user terminal 20 that the remote air conditioning has been operated.

As described above, according to the present embodiment, even if the vehicle is parked in a state in which a person is left behind in the rear seat of the vehicle 10, the remote air conditioning is operated, and thus an increase in temperature inside the vehicle can be suppressed. Further, when it becomes difficult to continuously operate the remote air conditioning, ventilating can be promoted by opening the window 10A. Thus, the remote air conditioning can be operated as much as possible, and the ventilation can be performed even when the remote air conditioning is stopped. Therefore, an increase in the in-vehicle temperature can be suppressed.

Second Embodiment

In the present embodiment, before the remote air conditioning is activated, the user terminal 20 is notified that a person is left behind. Then, in a case where the user terminal 20 does not respond to the notification, the remote air conditioning is activated. That is, even if the user is notified that a person is left behind in the rear seat of the vehicle 10, it is considered that the emergency is high when there is no response from the user, and thus the control unit 31 activates the remote air conditioning. For example, a notification indicating that a person is left behind in the rear seat, an image captured by the camera 111, and an inquiry about whether to operate the remote air conditioning may be transmitted to the user terminal 20.

Figure 4:
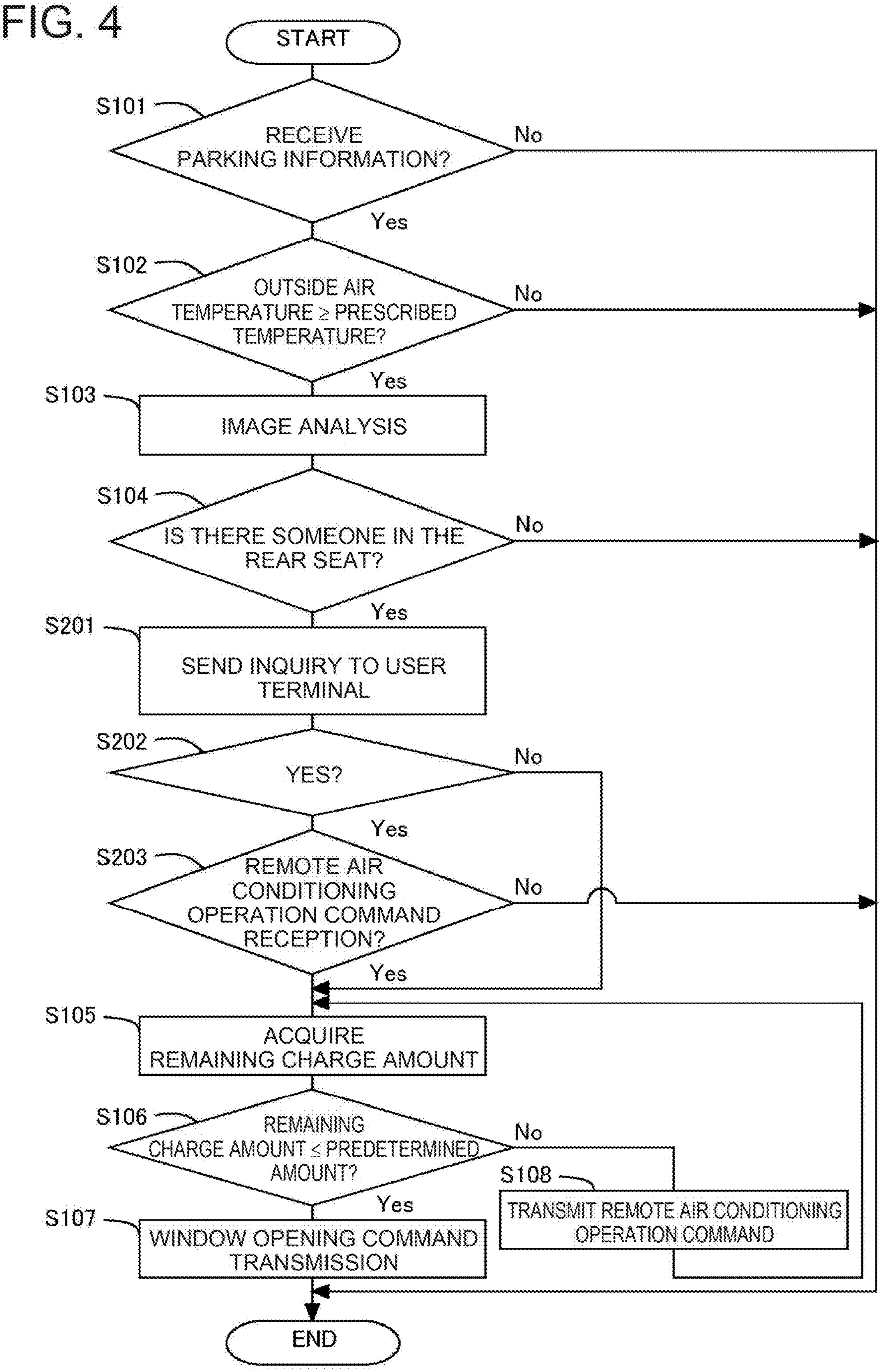
FIG. 4 is a flowchart illustrating processing in the server according to the second embodiment.

FIG. 4 is a flowchart illustrating processing in the server 30 according to the second embodiment. The flowchart illustrated in FIG. 4 is executed in the server 30 at predetermined time intervals. Note that the vehicle information DB 321 will be described on the assumption that required information is stored. Steps in which the same processing as the routine illustrated in FIG. 3 is executed are denoted by the same reference numerals, and description thereof will be omitted.

In the flow chart shown in FIG. 4, when the control unit 31 makes an affirmative determination in S104, the process proceeds to S201. In S201, the control unit 31 transmits, to the user terminal 20, an inquiry as to whether or not to operate the remote air conditioning. The control unit 31 extracts the user ID corresponding to the vehicle ID of the vehicle 10 that has received the parking information from the vehicle information DB 321. Then, the control unit 31 transmits an inquiry to the user terminal 20 associated with the user ID. The inquiry may include a notification that a person is left behind in the rear seat and an image captured by the camera 111. This inquiry may be made by push notification or by e-mail. Upon receiving the inquiry, the control unit 21 of the user terminal 20 causes the touch panel 24 to display a notification that a person is left behind in the rear seat, an image captured by the camera 111, and an inquiry as to whether or not to operate the remote air conditioning. In addition, for example, a GUI for selecting an answer of the inquiry is displayed on the touch panel 24 so that the user can enter the answer of the inquiry. GUI is, for example, a selection button in which the terms "operate remote air conditioning" and "not operate remote air conditioning" are displayed. When the user taps any of the selection buttons, the control unit 21 of the user terminal 20 generates an answer corresponding to the selection button tapped by the user and transmits the answer to the server 30.

In S202, the control unit 31 determines whether or not an answer has been received from the user terminal 20. For example, if there is an answer from the user terminal 20 within a predetermined period after the control unit 31 transmits the inquiry in S201, the control unit 31 makes an affirmative determination, and the process proceeds to S203. Here, the predetermined time is set as a time required for the user to answer. On the other hand, if there is no answer within the predetermined period, the control unit 31 makes a negative determination, and the process proceeds to S105.

In S203, the control unit 31 determines whether or not a remote air conditioning operation request has been received from the user terminal 20. The remote air conditioning operation request is a request to operate the remote air conditioning, and is included in a response transmitted from the user terminal 20. If the control unit 31 makes an affirmative determination on S203, the process proceeds to S105, and if a negative determination is made, the routine ends.

As described above, according to the present embodiment, it is possible for the user to determine whether or not to operate the remote air conditioning. Since the control unit 31 activates the remote air conditioning when there is no response from the user, it is possible to suppress the temperature rise inside the vehicle even when the user cannot give a response.

Other Embodiments

The above-described embodiment is merely an example, and the present disclosure may be appropriately modified and implemented without departing from the scope thereof. The processes and means described in the present disclosure can be freely combined and implemented as long as no technical contradiction occurs. Further, the processes described as being executed by one device may be shared and executed by a plurality of devices. Alternatively, the processes described as being executed by different devices may be executed by one device. In the computer system, it is possible to flexibly change the hardware configuration (server configuration) for realizing each function.

In the above-described embodiment, the control unit 31 of the server 30 executes the routines illustrated in FIGS. 3 and 4, but as another example, the control unit 101 of the vehicle 10 may execute the routines illustrated in FIGS. 3 and 4. In this case, in S101, the control unit 101 of the vehicle 10 determines whether or not the vehicle 10 is parked based on the activation state of the vehicle 10 and the state of the door lock 110. In addition, in S103, the control unit 101 of the vehicle 10 performs image analysis or requests the server 30 to perform image analysis. Then, in S107, the control unit 101 of the vehicle 10 opens the window 10A by operating the window actuator 109. On the other hand, in S108, the control unit 101 of the vehicle 10 operates the air conditioner 107. Furthermore, in S201, the control unit 101 of the vehicle 10 transmits an inquiry to the user terminal 20 via the server 30. Further, in S202, the control unit 101 of the vehicle 10 determines whether or not an answer has been received from the user terminal 20 via the server 30.

In the above-described embodiment, the control unit 31 determines whether or not a person is present in the rear seat based on an image captured by the camera 111. The present disclosure is not limited to this, and it may be determined whether or not a person is present in the rear seat based on, for example, a seating sensor that detects weight in the rear seat.

The present disclosure can also be implemented by supplying a computer with a computer program that implements the functions described in the above embodiment, and causing one or more processors of the computer to read and execute the program. Such a computer program may be provided to the computer by a non-transitory computer-readable storage medium connectable to the system bus of the computer, or may be provided to the computer via a network. Non-transitory computer-readable storage media include, for example, magnetic disks (floppy disks, hard disk drives (HDD), etc.). Non-transitory computer-readable storage media include, for example, any type of disc, such as an optical disc (CD-ROM, DVD disc, Blu-ray disc, etc.). Non-transitory computer-readable storage media include, for example, read only memory (ROM), random access memory (RAM), and EPROM, EEPROM. Non-transitory computer-readable storage media include, for example, magnetic cards, flash memory, optical cards, any type of media suitable for storing electronic instructions.

What is claimed is:

1. An information processing device comprising a processor that is configured to execute activating remote air conditioning of a vehicle in response to presence of a person in a rear seat of the vehicle that is being parked, determining whether a remaining charge amount of a battery of the vehicle is equal to or less than a predetermined amount, and opening a window of the vehicle in response to the remaining charge amount of the battery of the vehicle being equal to or less than the predetermined amount in a case where the remote air conditioning of the vehicle is being activated, wherein the predetermined amount is a minimum amount of electric power required to operate an actuator to open the window.

2. The information processing device according to claim 1, wherein the processor is configured to further execute activating the remote air conditioning of the vehicle in a case where the person is present in the rear seat of the vehicle and an air temperature is equal to or higher than a predetermined temperature.

3. The information processing device according to claim 1, wherein the processor is configured to further execute notifying a terminal of a user of the presence of the person in the rear seat of the vehicle in response to the presence of the person in the rear seat of the vehicle, and activating the remote air conditioning of the vehicle in response to no response from the terminal of the user.

4. The information processing device according to claim 1, wherein the processor is configured to further execute acquiring, from the vehicle, output data of a sensor that detects the person who is present in the rear seat of the vehicle, determining whether the person is present in the rear seat of the vehicle based on the output data of the sensor, transmitting a command to activate the remote air conditioning of the vehicle to the vehicle in response to the determining of the presence of the person in the rear seat of the vehicle, and acquiring information regarding the remaining charge amount of the battery of the vehicle from the vehicle in a case where the remote air conditioning of the vehicle is being activated.

5. The information processing device according to claim 3, wherein the processor is configured to further execute transmitting an image of the rear seat captured by a camera mounted in the vehicle to the terminal of the user together with a notification indicating that the person is present in the rear seat.

6. The information processing device according to claim 1, wherein the processor is configured to further execute opening the window to a predetermined opening degree that suppresses intrusion into the vehicle from outside.

* * * * *